Nov. 21, 1950     A. E. BOWEN     2,530,373
ULTRA HIGH FREQUENCY ELECTRONIC DEVICE
Filed May 4, 1943     11 Sheets-Sheet 1

INVENTOR
A. E. BOWEN
BY Franklin Mohr
ATTORNEY

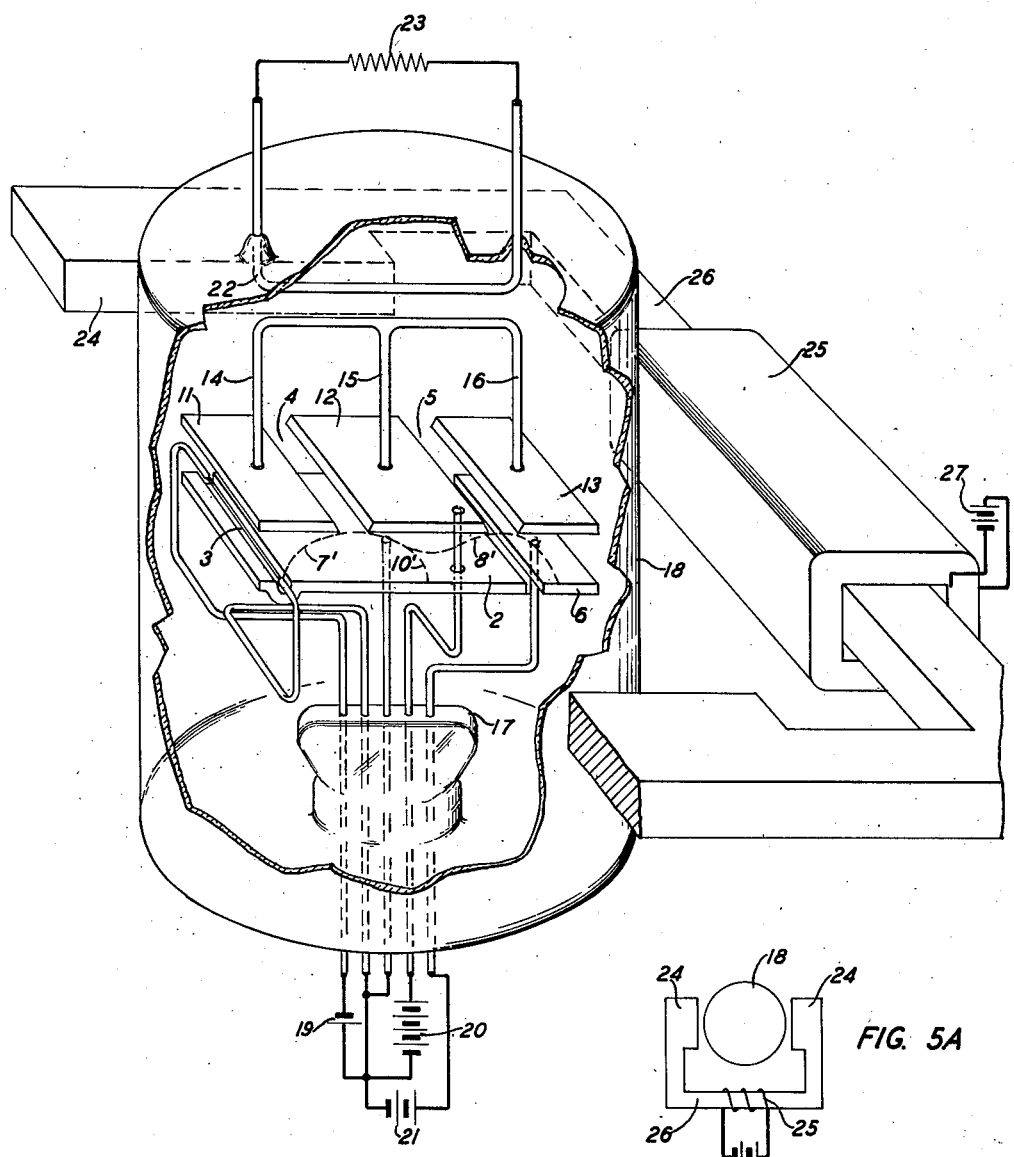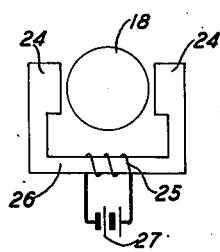

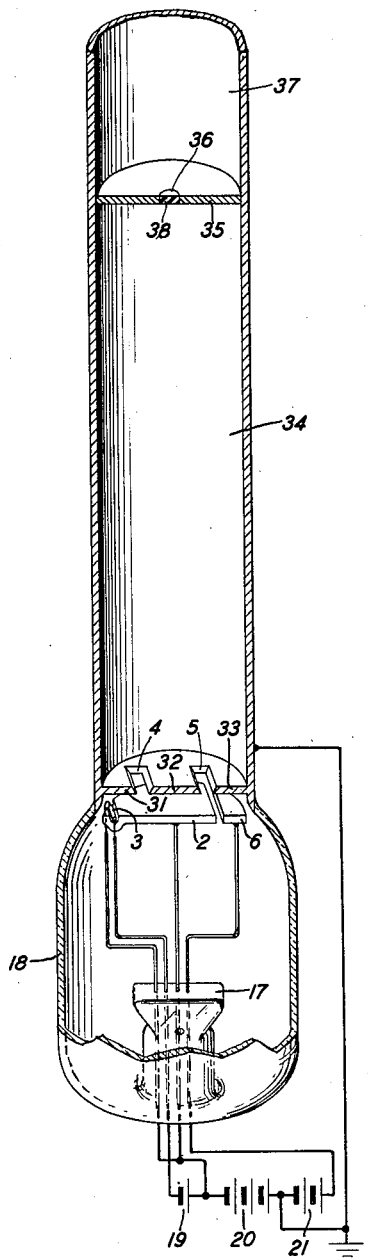
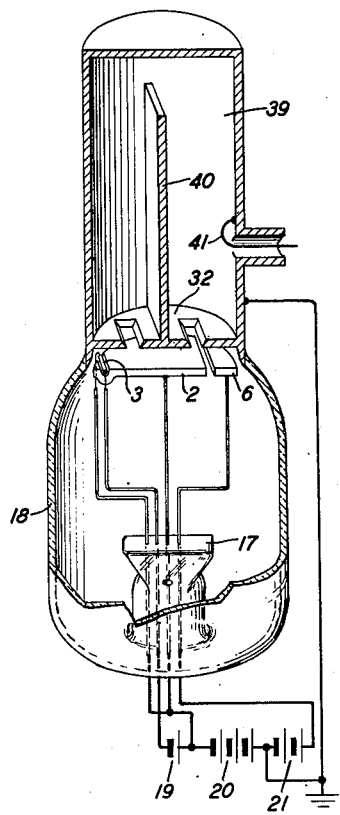

Nov. 21, 1950 A. E. BOWEN 2,530,373
ULTRA HIGH FREQUENCY ELECTRONIC DEVICE
Filed May 4, 1943 11 Sheets-Sheet 4

INVENTOR
A. E. BOWEN
BY
Franklin Mohr
ATTORNEY

Nov. 21, 1950  A. E. BOWEN  2,530,373
ULTRA HIGH FREQUENCY ELECTRONIC DEVICE
Filed May 4, 1943  11 Sheets-Sheet 5

INVENTOR
A. E. BOWEN
BY Franklin Mohr
ATTORNEY

Nov. 21, 1950          A. E. BOWEN          2,530,373
ULTRA HIGH FREQUENCY ELECTRONIC DEVICE
Filed May 4, 1943          11 Sheets-Sheet 6
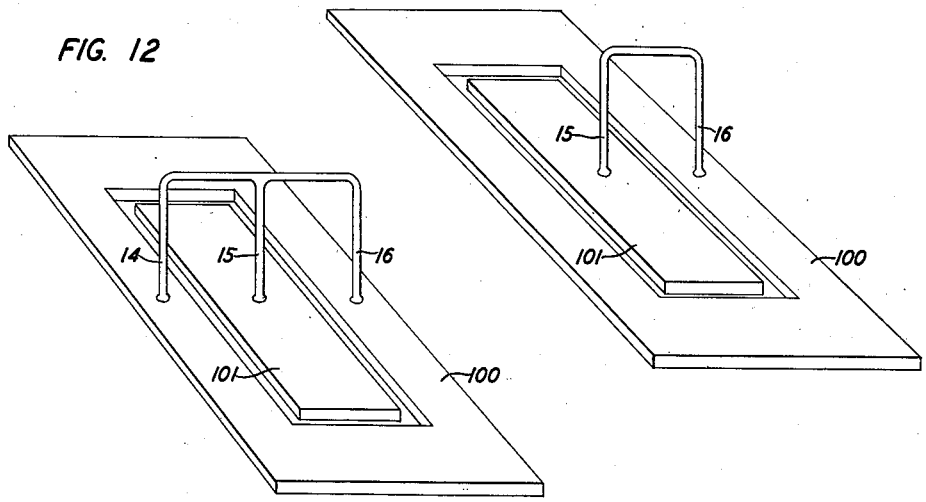
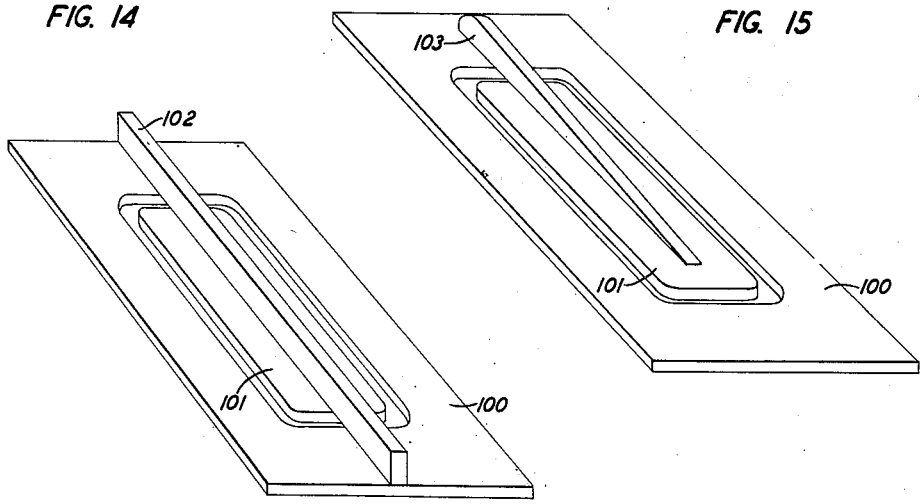
INVENTOR
*A. E. BOWEN*
BY
*Franklin Mohr*
ATTORNEY Nov. 21, 1950 A. E. BOWEN 2,530,373
ULTRA HIGH FREQUENCY ELECTRONIC DEVICE
Filed May 4, 1943 11 Sheets-Sheet 7

INVENTOR
A. E. BOWEN
BY
Franklin Mohr
ATTORNEY

Nov. 21, 1950     A. E. BOWEN     2,530,373
ULTRA HIGH FREQUENCY ELECTRONIC DEVICE
Filed May 4, 1943     11 Sheets-Sheet 8

MAGNETIC FIELD
DIRECTED PARALLEL
TO CATHODE 51.

INVENTOR
A. E. BOWEN
BY
Franklin Mohr
ATTORNEY

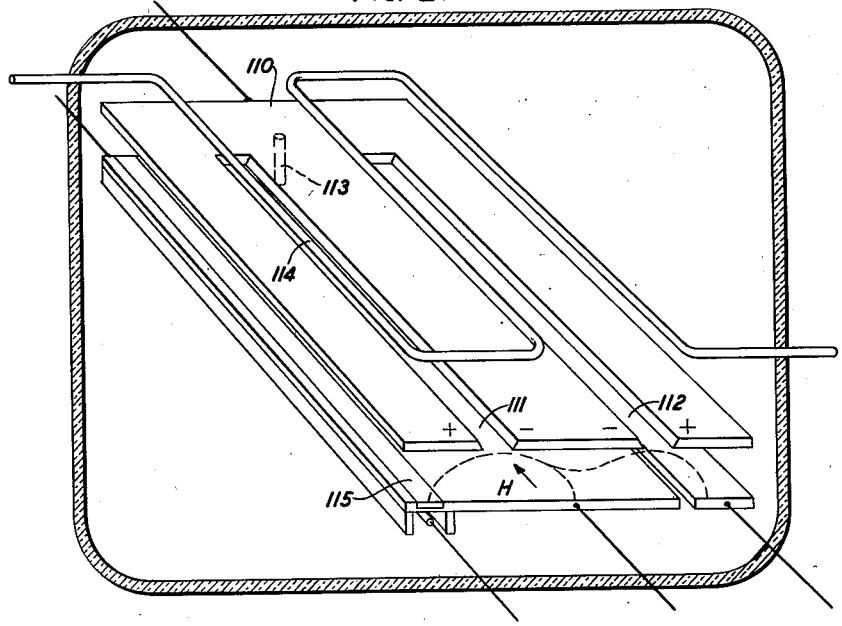
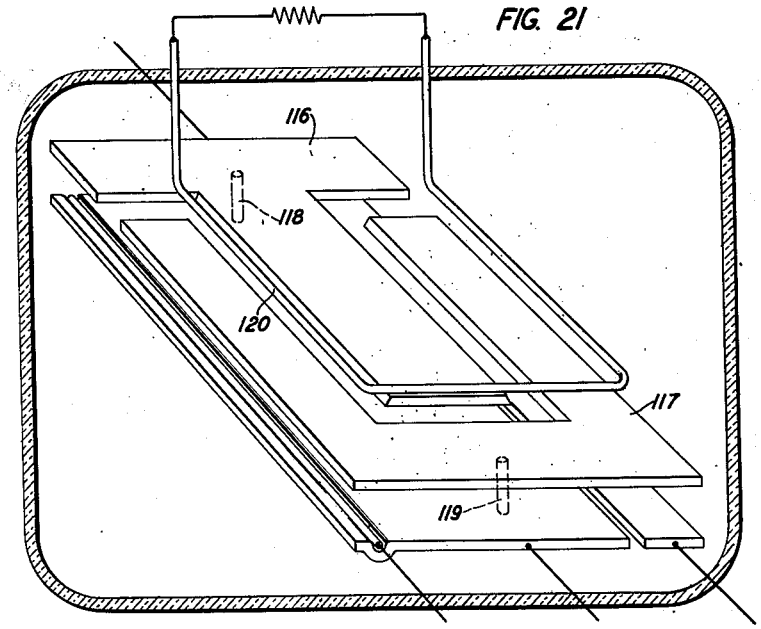

INVENTOR
A. E. BOWEN
BY Franklin Mohr
ATTORNEY

Nov. 21, 1950     A. E. BOWEN     2,530,373
ULTRA HIGH FREQUENCY ELECTRONIC DEVICE

Filed May 4, 1943     11 Sheets-Sheet 11

INVENTOR
A. E. BOWEN
BY
*Franklin Mohr*
ATTORNEY

Patented Nov. 21, 1950

2,530,373

UNITED STATES PATENT OFFICE 2,530,373

ULTRA HIGH FREQUENCY ELECTRONIC DEVICE

Arnold E. Bowen, Red Bank, N. J., assignor to Bell Telephone Laboratories, Incorporated, New York, N. Y., a corporation of New York Application May 4, 1943, Serial No. 485,579

9 Claims. (Cl. 250—27.5)

This invention relates to arrangements for effecting energy interchanges in high frequency electromagnetic systems particularly between a stream of moving charged particles such as electrons, and electromagnetic waves guided or enclosed by electrical conductors.

In devices of this type, it is common practice to determine the trajectories of the charged particles either by means of an electric field alone or by a combination of electric and magnetic field components. Devices in which the combined type of trajectory control is employed are commonly called magnetrons. In one known class of magnetrons an electric field is maintained by impressing a potential between parallel plane plates, while at the same time a magnetic field is maintained parallel to the plates and hence perpendicular to the electric field. It is known that electrically charged particles upon being exposed to the action of mutually perpendicular electric and magnetic fields and having initial velocities confined to the direction perpendicular to both the electric and magnetic field intensity vectors, move in cycloidal and trochoidal paths. In magnetrons with cycloidal or trochoidal electron trajectories, use has been made, as far as I am aware, only of that part of the energy residing in the transverse component of the electron velocity. In other words, the energy utilized has been taken from the electron during the part of its motion perpendicular to the planes between which it moves.

It is a feature of the present invention that energy is abstracted from the electron when it is traveling parallel to the planes between which it moves. The invention may be embodied in oscillators, amplifiers, repeaters, and the like, particularly for high frequency and microwave applications, wherever generation, repetition, control or amplification of electromagnetic waves is an object.

In accordance with the invention, a stream of charged particles is constrained to move in a trajectory comprising a series of cycloidal or trochoidal hops, progressing along a predetermined axis. The motion is characterized by the alternate intervals of relatively high forward axial speed and relatively low or reversed axial speed peculiar to cycloidal or trochoidal motion under substantially constant forces. The regions of relatively high axial speed may conveniently be designated as loops and the intervals of relatively low or reversed axial speed as nodes, in partial analogy to the alternate loops and nodes of a vibrating air column. The stream of charged particles is subjected to a cyclical velocity variation followed by a separation of accelerated and decelerated electrons to form a density varied stream which may be used to excite oscillations in a resonator of suitable form. In accordance with the invention, the velocity variation and oscillation excitation operations are carried out at loops in the cycloidal path while the stream is density varied by withdrawing some of the electrons from the stream in a region near a nodal point of the path.

It has already been proposed to perform upon a stream of charged particles the operations of velocity variation, velocity sorting and energy abstraction in that order and at successive points along the path of the stream. It is also known that velocity sorting may be effected by variably curving or deflecting the stream. The arrangements of the present invention, however, have an advantage not found in prior devices, namely that the path of the stream is kept away from the vicinity of the deflecting or controlling electrodes except at those points where the operations of velocity variation, removal of unwanted particles, and abstraction of energy are to be effected. As a result, energy losses and noise currents caused by charged particles striking the deflecting or controlling electrodes are largely avoided. Other features and advantages of the invention will be evident from the following description.

Several illustrative embodiments of the invention are described in detail hereinafter with reference to the accompanying drawings, in which:

Fig. 5 is a perspective view, partially broken away, showing an embodiment of the invention in an oscillator;

Fig. 5A is a plan view of the device of Fig. 5;

Figs. 6 and 7 show longitudinal sections in perspective of two forms of an oscillator utilizing a resonator which comprises a section of a wave guide;

Figure 18:
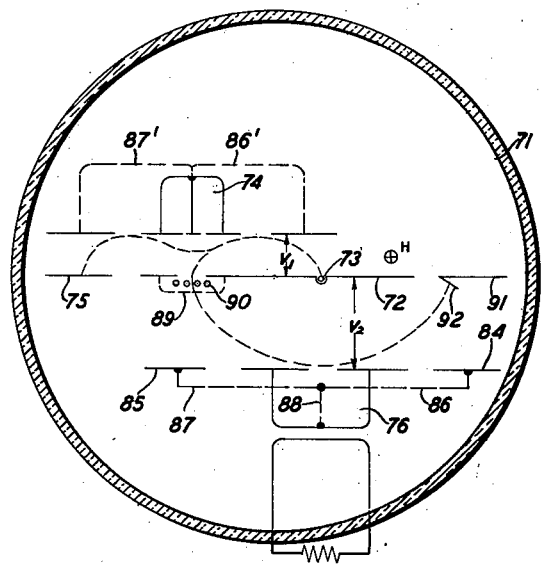
Figure 19:
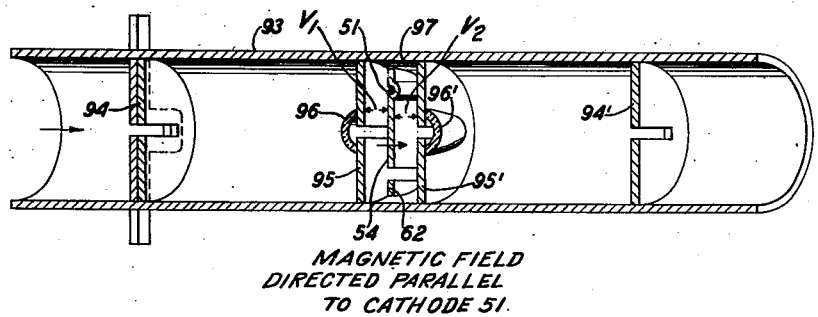
Figure 22:
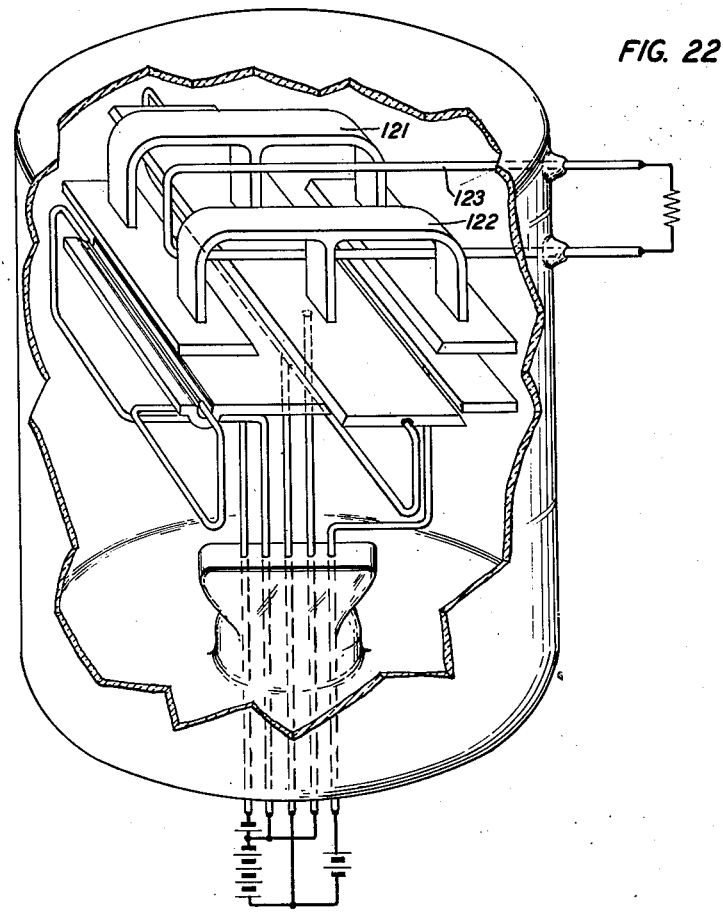
Figure 23:
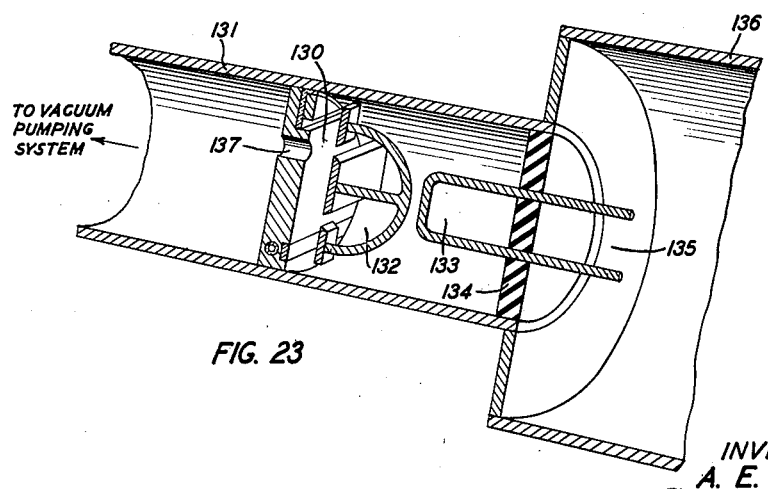
Figure 24:
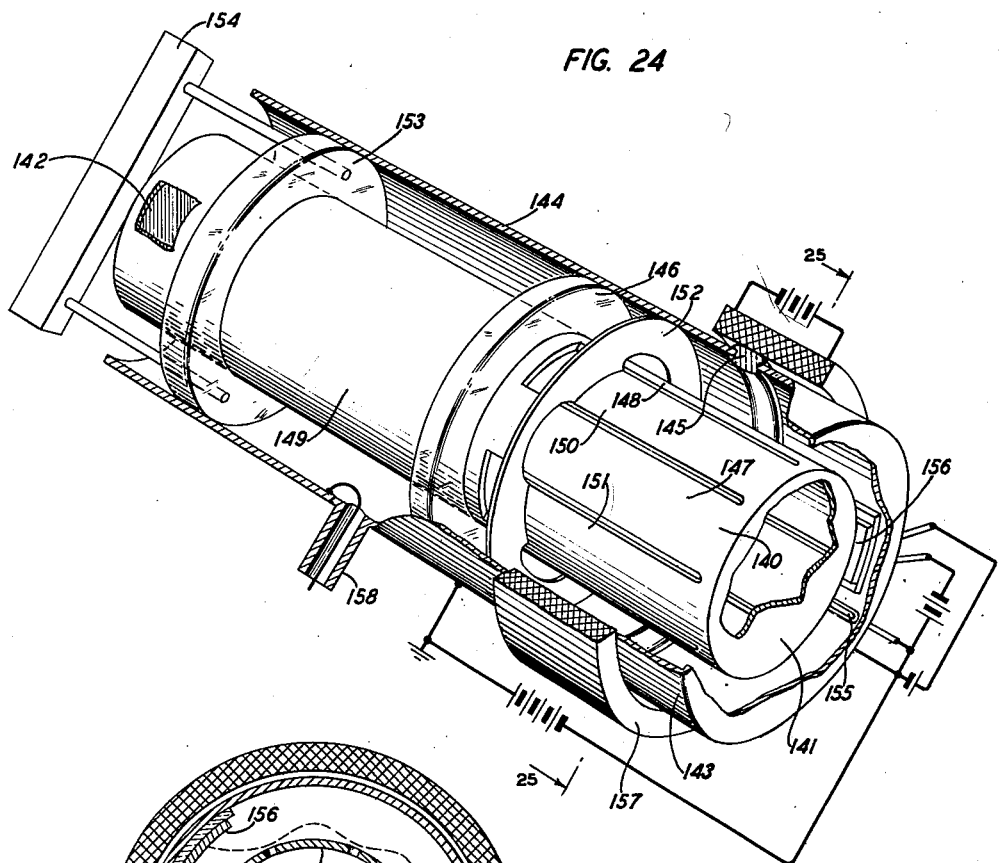
Figure 25:
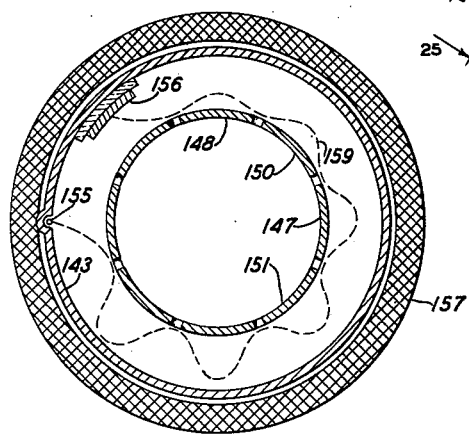

Figs. 12 to 17, inclusive, are perspective views of tuned circuit structures adapted for use in various embodiments of the invention;

Fig. 18 is a schematic diagram of another form of electron coupled oscillator-amplifier;

Fig. 19 is a perspective view in longitudinal section, showing a repeater in a wave guide transmission line;

Figs. 20 and 21 are perspective views, partly diagrammatic, showing other structures embodying the invention in an oscillator;

Fig. 22 is a perspective view, partially broken away, showing another embodiment of the invention in an oscillator;

Fig. 23 is a perspective view, in longitudinal section, showing another embodiment in an oscillator coupled to a wave guide;

Fig. 24 is a perspective view, partially broken away, showing an adaptation of the invention to utilize concentric cylindrical plates in place of plane parallel plates; and Fig. 25 is a sectional view of the structure of Fig. 24.

The principles underlying the invention are conveniently explained with reference to Fig. 1 wherein are represented diagrammatically two parallel plane plates 1 and 2 separated a distance $a$ and maintained at a substantially constant potential difference $V_0$, plate 1 being positive with respect to plate 2. The resultant electric field intensity $$E = \frac{V_0}{a}$$

acts downward in the plane of the drawing as indicated by arrows in the figure. A cathode 3 is located in the plane of plate 2 and may be insulated from the plate so that the cathode may be a directly heated filament if desired. Slots or gaps 4 and 5 are made in plate 1 on centers spaced apart a distance $\pi a$, the slot 4 being located a horizontal distance $$\frac{1}{2}\pi a$$

from the cathode 3. A collector plate 6 is located in the plane of plate 2, insulated therefrom, and preferably maintained at a potential somewhat positive with respect to plate 2. A substantially uniform magnetic field of intensity H is maintained with its lines of force directed perpendicular to the plane of the drawing in the sense away from the reader. It is assumed for the purpose of the explanation that the uniformity of the fields E and H is not materially disturbed by any edge effects or by the presence of the cathode 3, the collector 6 or the slots 4 and 5. Assuming further that electrons are released with zero velocity at the cathode 3, then, according to known principles the electrons will travel in trajectories such as that shown in the curve 7, which is a common cycloid. The assumed conditions may readily be approximated in practice.

Figure 1:
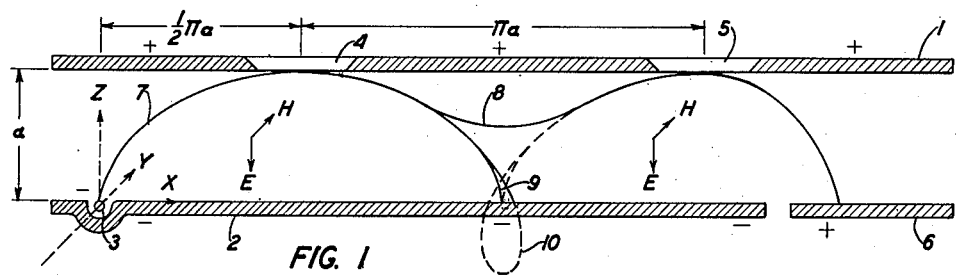
Fig. 1 is a somewhat diagrammatical cross-sectional view of a typical mechanism for controlling the trajectories of a succession of charged particles in accordance with the invention.

The equations of motion of an electron in the system of Fig. 1 are readily set up and the equations of the electron paths under given boundary conditions derived therefrom by conventional analytical methods. It is therefore deemed unnecessary to present a detailed solution and only the basic equations and final results are set down here.

Assuming a set of mutually perpendicular rectangular coordinate axes X, Y, Z, directed as indicated in Fig. 1, the equations of motion for an electron of charge $e$ and of mass $m$ are $$\frac{d^2x}{dt^2} = \frac{eH}{mc}\frac{dz}{dt} \tag{1}$$

$$\frac{d^2y}{dt^2} = 0 \tag{2}$$

$$\frac{d^2z}{dt^2} = \frac{eE}{m} - \frac{eH}{mc}\frac{dx}{dt} \tag{3}$$

where $c$ is the velocity of light, and $e$, E, and H are to be taken as positive numbers. The equations are adjusted for the Gaussian system of units, $e$ and E being in electrostatic units, H in electromagnetic units, $m$ in grams, distances in centimeters, time in seconds, and $c$ in centimeters per second. As the problem is fundamentally one of two dimensions only, it will not be necessary to consider further the y-coordinate nor equation (2). Additional simplification of the analysis may be had by introducing the following abbreviations:

$$\frac{eH}{mc} = p \tag{4}$$

$$\frac{cE}{H} = s_0 \tag{5}$$

the use of which makes $$\frac{eE}{m} = ps_0 \tag{6}$$

The equations to be solved then reduce to $$\frac{d^2x}{dt^2} = p\frac{dz}{dt} \tag{7}$$

$$\frac{d^2z}{dt^2} = p\left(s_0 - \frac{dx}{dt}\right) \tag{8}$$

The complete solution of the simultaneous equations (7) and (8) is $$x = C_1 \sin pt - C_2 \cos pt + s_0 t + C_3 \tag{9}$$

$$z = C_2 \sin pt + C_1 \cos pt + \frac{s_0}{p} - \frac{C_4}{p} \tag{10}$$

from which the following may be derived by differentiation:

$$\frac{dx}{dt} = p(C_1 \cos pt + C_2 \sin pt) + s_0 \tag{11}$$

$$\frac{dz}{dt} = p(C_2 \cos pt - C_1 \sin pt) \tag{12}$$

$$\frac{d^2x}{dt^2} = -p^2(C_1 \sin pt - C_2 \cos pt) \tag{13}$$

$$\frac{d^2z}{dt^2} = -p^2(C_2 \sin pt + C_1 \cos pt) \tag{14}$$

In (9) to (14) inclusive, $C_1$, $C_2$, $C_3$ and $C_4$ stand for the constants of integration.

From the general solutions (9) and (10) a particular solution may be had for the case of particles starting from rest at the origin at the time when $t$ is zero by using the initial conditions represented by $$x = z = \frac{dx}{dt} = \frac{dz}{dt} = 0 \tag{15}$$

to determine the constants of integration. The result is readily found to be $$x = \frac{s_0}{p}(pt - \sin pt) \tag{16}$$

$$z = \frac{s_0}{p}(1 - \cos pt) \qquad (17)$$

the standard equations of a common cycloid.

Referring to the curve 7 in Fig. 1 the left-hand portion of the curve represents the common cycloid of equations (16) and (17). The curve will have a maximum value of $z$ for the condition $$pt = \pi \qquad (18)$$

and at this point it will be found that $$x = \frac{\pi s_0}{p} \qquad (19)$$

$$z = \frac{2s_0}{p} \qquad (20)$$

$$\frac{dx}{dt} = 2s_0 \qquad (21)$$

$$\frac{dz}{dt} = 0 \qquad (22)$$

Assuming that the spacing $a$ has been so chosen that the cycloidal trajectory 7 will just graze the plate 1, it will be evident that the maximum $z$-coordinate of the trajectory will be equal to $a$ and it will be found that at $pt = \pi$, $$x = \frac{1}{2}\pi a \qquad (23)$$

and $$z = a \qquad (24)$$

where $$a = \frac{2s_0}{p} = \frac{2mc^2 E}{eH^2} \qquad (25)$$

In accordance with the invention, a velocity variation is impressed upon the particles as they pass the first point of maximum $z$-coordinate, by means of a variable potential difference across the slot 4 which will be suitably superposed upon the initial potential $V_0$ of the plate 1 as a whole. Then the potential which acts upon a given electron causing it to approach and pass the gap 4 may be expressed as $$V = V_0 + \delta V_0 \qquad (26)$$

where $\delta$ is a small factor which in ordinary practice will usually lie within limits between $-1$ and $+1$. It will be evident from Fig. 1, that the initial potential $V_0$ acts continually to accelerate the electrons towards the plate 1 while the magnetic field deflects the electron until upon reaching the gap 4 the electron is travelling substantially parallel to the plate 1. The increment of potential represented by $\delta V_0$ is effective mainly in the immediate vicinity of the gap 4 and exerts a force upon the electrons in a direction substantially parallel to the plane of the plate 1 and hence in the direction of the motion of the electrons to accelerate or decelerate the electron briefly while the electron is passing the gap 4. Thus the potentials $V_0$ and $\delta V_0$ may properly be added algebraically to express the total effective potential $V$. If we assume that a given electron leaves the gap 4 with a speed $s$ determined by the potential $V$ as given in (26), then the equation $$Ve = \frac{1}{2}ms^2 \qquad (27)$$

represents the relationship between $V$ and $s$ based upon the conversion of potential energy into kinetic energy. Solving (27) for $s$ and using (26) gives $$s = \sqrt{\frac{2(V_0 + \delta V_0)e}{m}} \qquad (28)$$

Using $$V_0 = aE \qquad (29)$$

together with (25) and (4), we have $$s = 2s_0\sqrt{1+\delta} \qquad (30)$$

The trajectory of an electron after it leaves the gap 4 must be such as to satisfy the equations of motion (1), (2) and (3) as well as the new initial conditions produced by the velocity variation. The latter conditions are such that when $$pt = \pi \qquad (31)$$

then $$x = \frac{1}{2}\pi a \qquad (32)$$

$$z = a \qquad (33)$$

$$\frac{dx}{dt} = 2s_0\sqrt{1+\delta} = ap\sqrt{1+\delta} \qquad (34)$$

and $$\frac{dz}{dt} = 0 \qquad (35)$$

Under these conditions it is readily found that $$x = \frac{a}{2}[pt - (2\sqrt{1+\delta} - 1)\sin pt] \qquad (36)$$

$$z - a(1 - \sqrt{1+\delta}) = \frac{a}{2}[1 - (2\sqrt{1+\delta} - 1)\cos pt] \qquad (37)$$

Equations (36) and (37) will be recognized as the equations of a family of trochoids generated by a movable point, distant $$b = \frac{a}{2}(2\sqrt{1+\delta} - 1) \qquad (38)$$

from the center of a circle of diameter $a$ which is rolling upon and above the line $$z = a(1 - \sqrt{1+\delta}) \qquad (39)$$

The $x$-component of velocity is $$\frac{dx}{dt} = s_0[1 - (2\sqrt{1+\delta} - 1)\cos pt] \qquad (40)$$

The trochoids corresponding respectively to the values $\delta = -0.5$, $\delta = 0$, and $\delta = +0.5$ are plotted in Fig. 1 as curves 8, 9 and 10. Curve 9 is a common cycloid, which is a special case of a trochoid.

Two important characteristics of the trajectories are to be deduced from the above analysis. The first is that all the trajectories regardless of the $\delta$-value pass through a common point near the gap 5. The second important deduction is that the average value of the $x$-velocity of each particle is equal to $s_0$, independently of the $\delta$-value. In particular the result is found that the transit time between the gaps 4 and 5 is the same for all the particles regardless of the length and shape of trajectory. Both these characteristics may be verified by substituting $pt = 3\pi$ in (36) and (37) which gives $$x = \frac{3\pi a}{2} \qquad (41)$$

$$z = a \qquad (42)$$

which expressions are independent of $\delta$ and determine the above-mentioned common point at the gap 5. The average speed of any particle while traversing the distance between the gaps 4 and 5 is the intergap distance $\pi a$ divided by the transit time from $pt=\pi$ to $pt=3\pi$, which speed amounts to $$\frac{1}{2}ap, \text{ or } s_0$$

In accordance with the invention, the passage of charged particles across the gap 5 in a density varied stream causes an alternating current to be induced in the plate 1. The stream is given a density variation by the action of the plate 2 which is so placed as to intercept particles in a group of trajectories represented by curve 10 while particles in a group of trajectories represented by curve 8 pass on unintercepted. The velocity variation impressed upon the stream at the gap 4 produces a cyclical variation in the trajectories of successive particles ranging in turn through trajectories of the type of curve 8, the cycloidal type 9, the type of curve 10, the cycloidal type again and back to the type of curve 8, etc. Only the particles following trajectories of the type 8 reach the gap 5 and these form a density varied or intermittent stream at the gap 5. Plate 6 serves to collect the spent particles after they leave the gap 5. The parts of the curves 9 and 10 which are unoccupied by particles because of interception by plate 2 are shown dotted in Fig. 1.

It will be noted that the mechanism described is one for transforming a steady stream of charged particles into an intermittent or density varied stream. It will be noted further that the grouping of the particles is not dependent upon the principle of fast moving particles overtaking slower moving particles. The principle employed is one of segregating those particles which exceed a certain critical velocity.

It will be noted further that the charged particles approaching the gap 4 are moving with substantially a uniform velocity and in a direction parallel to the plate 1. This condition might be brought about in various ways other than by locating the cathode 3 in the plane of the plate 2 and using the mechanism described for producing the cycloidal trajectory 7. For example, the stream of charged particles might be made to approach the gap 4 along a straight path parallel to the plate 1 under the influence of an electric field in the absence of the magnetic field H. The mechanism shown and the use of the cycloidal trajectory 7 will ordinarily be simplest and most expedient, but it will be understood that it is within the scope of the invention to employ any suitable means to provide a stream of charged particles which approaches the gap 4 with substantially uniform velocity and charge density.

In any case, after leaving the gap 4 the motion of the particles is characterized by a periodic component of motion in the direction of the electric field superposed upon a general progression or drift in the direction perpendicular to the plane common to the electric and magnetic vectors. In the neighborhoods of gap 4 and gap 5 the periodic component of motion in the direction of the electric force has resulted in a maximum displacement in compliance with the electric field. In the region where certain of the trajectories meet the ground plate 2, the particles are moving in opposition to the electric field. In the case of trajectories of the type of curve 10 there is superposed upon the drift motion an incidental periodic component which could be utilized if circumstances warranted.

The velocity variation at the gap 4 effects a control over the periodic motion in the direction of the electric force, namely a control of the amplitude of such periodic motion. Under the variable amplitude conditions, however, all the variation is confined to the region in which the particles move against the force of the electric field, as described, the excursion of the particles in compliance with the electric force being limited to the uniform maximum value $a$ by the combined effect of the electric and magnetic fields.

In the operation of the device as an amplifier, the potential of the gap 4 is varied by means of the wave to be amplified and the output resonator is connected across the gap 5. The spacing $\pi a$ between the gaps 4 and 5, as seen from (25), is a function of both E and H, varying directly as E and inversely as the square of H. The transit time between the gaps is $$\frac{2\pi}{p}$$

and varies inversely with H, independently of E. There is, moreover, no critical transit time required in the amplifier case.

In the operation of the device as an oscillator, the available values of H are limited once the frequency of the desired oscillation is determined. It has been shown above that the particles which pass the gap 5 when the plate 2 is in place are those which are decelerated at the gap 4. In order for these particles to contribute energy to the field at the gap 5 the particles must pass gap 5 while the field is opposing their motion. In a case where the gaps 4 and 5 are excited in such manner that the fields at the two gaps are poled in the same direction, an integral number of periods of the oscillation should elapse between the passage of a particle across the gap 4 and its subsequent passage across the gap 5.

In the case of an amplifier, the gap 4 serves as an input gap to which an input resonator and a source of waves to be amplified may be coupled, while the gap 5 serves as an output gap to which an output resonator and a load may be coupled. In the case of an oscillator, which as is well known, generally comprises an amplifier with the input and output circuits thereof coupled together in regenerative relationship, the first gap 4 may still be regarded as an input gap inasmuch as the potential difference existing across this gap during oscillation acts upon the electron beam to impress thereon a velocity variation. The second gap 5 may also still be regarded as an output gap in an oscillator inasmuch as the electron beam passing this gap is primarily active to induce and maintain an alternating potential difference across the gap.

In terms of the frequency, $f$, the relation $$\frac{n}{f}=\frac{2\pi}{p}=\frac{2\pi mc}{eH} \tag{43}$$

must hold, where $n$ is any integer, or, in terms of the free space wave-length, $\lambda$, $$\frac{n\lambda}{c}=\frac{2\pi mc}{eH} \tag{44}$$

It will be noted that in a given device of this type $m$, $c$ and $e$ are natural constants and the product $\lambda H$ is dependent upon these constants as well as upon the value of $n$ which may be chosen. Thus, $$\lambda H=\frac{2\pi mc^2}{ne} \tag{45}$$

in which formula $\lambda$ is to be expressed in centimeters, H in electromagnetic units and $e$ in electrostatic units. The same thing with electromagnetic units throughout is $$\lambda H = \frac{2\pi mc}{ne} \quad (46)$$

which, when the charged particles are electrons becomes approximately $$\lambda H = \frac{10650}{n} \quad (47)$$

It will be evident from equation (47) that the larger the value of $n$ selected the smaller the value of $H$ required for oscillations of a given wave-length.

The value of the spacing $a$ between the plates as given by (25) may be expressed in terms of $V_0$ as follows:

$$a = \frac{c}{H}\sqrt{\frac{2mV_0}{e}} \quad (48)$$

which formula is applicable either to an amplifier or an oscillator. Since in the case of the electron oscillator $\lambda H$ is given by (45), the spacing will be $$a = \frac{n\lambda}{\pi c}\sqrt{\frac{V_0 e}{2m}} \quad (49)$$

centimeters where $V_0$ and $$\frac{e}{m}$$

are in electromagnetic units, $\lambda$ is in centimeters, and the velocity of light, $c = 3 \times 10^{10}$ centimeter/seconds, or $$a = \frac{n\lambda\sqrt{V_0}}{3160} \quad (50)$$

centimeters where $\lambda$ is in centimeters and $V_0$ in volts.

Figure 2:
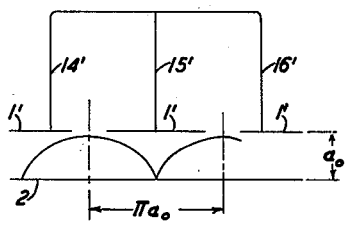
Figs. 2, 3 and 4 are diagrams showing a variety of proportionings of the essential parts of the trajectory control mechanism.
Figure 3:
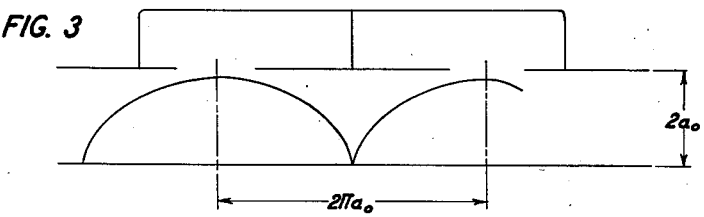
Figure 4:
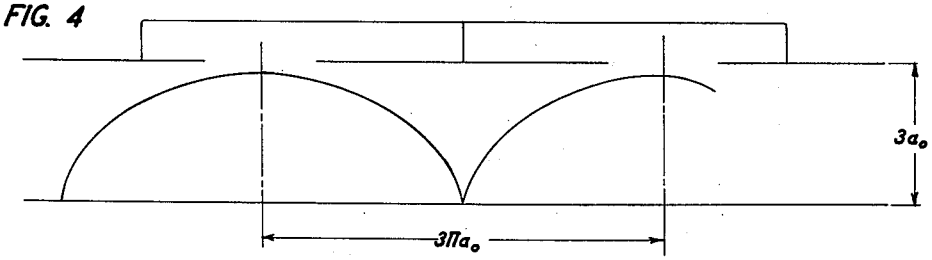

A number of examples coming out of formula (50) have been computed and are shown diagrammatically in Figs. 2, 3 and 4. It will be noted that for given values of $\lambda$ and $V_0$, the spacing $a$ is proportional to $n$. Thus, if, as in Fig. 2, $a$ has the value $a_0$ corresponding to $n=1$; then for the same wavelength and same voltage, the spacing is $2a_0$ for $n=2$, which case is shown in Fig. 3; and $3a_0$ for $n=3$, as shown in Fig. 4. The spacing of the gaps is equal to $\pi a$ in every case. For a wavelength of 10 centimeters and a voltage $V_0$ of 1,000 volts, the value of $a_0$ comes out approximately 1 millimeter.

Various changes in the values of $V_0$ and $H$ may be made, at the same time changing $n$ so that the required spacing remains the same. For example, in Fig. 2 if $n$ is made 2 and the wavelength and spacing remain unchanged, the voltage must be reduced to one-fourth its former value. The change in $n$ also requires that $H$ be reduced to one-half its former value, in order that (47) may be satisfied.

Several possible combinations of values for a 10 centimeter wavelength in the diagram of Fig. 2 are tabulated in Table I.

*Table I*

| $a$, cm. | $n$ | $V_0$, volts | $H$, oersteds | $\lambda$, cm. |
|---|---|---|---|---|
| 0.1 | 1 | 1,000 | 1,065 | 10 |
| 0.1 | 2 | 250 | 532 | 10 |
| 0.1 | 3 | 111 | 355 | 10 |

Several possible combinations for a 10 centimeter wave length in the diagram of Fig. 3 are given in Table II.

*Table II*

| $a$, cm. | $n$ | $V_0$, volts | $H$, oersteds | $\lambda$, cm. |
|---|---|---|---|---|
| 0.2 | 1 | 4,000 | 1,065 | 10 |
| 0.2 | 2 | 1,000 | 532 | 10 |
| 0.2 | 3 | 445 | 355 | 10 |
| 0.2 | 4 | 250 | 267 | 10 |

Combinations for the diagram of Fig. 4 are given in Table III.

*Table III*

| $a$, cm. | $n$ | $V_0$, volts | $H$, oersteds | $\lambda$, cm. |
|---|---|---|---|---|
| 0.3 | 1 | 9,000 | 1,065 | 10 |
| 0.3 | 2 | 2,250 | 532 | 10 |
| 0.3 | 3 | 1,000 | 355 | 10 |

Conductors 14′, 15′ and 16′ of a resonant circuit are shown schematically, connecting the plate segments 1′ in Fig. 2. To indicate resonance at the same wavelength in Figs. 3 and 4 as in Fig. 2, the areas enclosed by the conductors are shown approximately equal in all three figures.

Fig. 5 represents an embodiment of the invention in an oscillator complete with a resonating circuit, an output coupling device and means for supplying the requisite electric and magnetic field intensities. The equivalent of the plate 1 of Fig. 1 is represented in Fig. 5 by a three-segment anode having segments 11, 12 and 13 connected together by conductors 14, 15 and 16, the latter, together with the anode segments, comprising a resonant circuit. The inductance of the resonant circuit resides mainly in the conductors 14, 15 and 16 while the capacitance is mainly between segments 11 and 12 at the input gap 4 and between segments 12 and 13 at the output gap 5. The negative or ground plate 2 has a depression in which the cathode 3 is insulatingly mounted. These parts, together with the collector plate 6, are supported by rods held in a press 17 of conventional type formed in the wall of a vacuum-tight container 18, which wall may, for example, be of glass. The supporting rods may serve also as electrical connections from the plates to the sources of electromotive force. The latter sources may constitute batteries or other suitable devices, of which 19 serves to heat the cathode, 20 to polarize the anode segments 11, 12, 13 positively with respect to the ground plate 2, and 21 serves to maintain the collector 6 preferably at a somewhat positive potential with respect to the plate 2. Coupled to the conductors 14 and 16 is a coupling loop 22 the ends of which may project through the envelope 18 and be connected to any suitable load device for transmitting or utilizing the generated oscillations, the load circuit here being represented by a resistor 23. An electromagnet comprising pole-pieces 24, winding 25, a yoke 26 and energized by suitable means such as a battery 27, is provided preferably external to the envelope 18 and is set up in such a position (Fig. 5A) as to provide a magnetic field having lines of force substantially parallel to the cathode 3 and the several plates.

The cycloidal path of a typical electron leaving the cathode 3 and approaching the gap 4 is shown at 7′. The path of this electron, should it be decelerated at the gap 4, is indicated at 8′ showing that its trajectory continues past the gap 5 and preferably ends upon the collector plate 6. Should the same electron instead be accelerated at the gap 4 its path is indicated at 10′, ending upon the ground plate 2 and not reaching the gap 5.

The spacing between the ground plate and the anode is determined as described hereinbefore in connection with Fig. 1, for a desired operating wave-length at a given voltage and for a chosen value of $n$, according to (50). The resonator is proportioned to be resonant to the operating wave-length. Further details of the operation of the system of Fig. 5 will be evident from the explanation given hereinabove in connection with Fig. 1.

Figs. 6 and 7 show how the device of Fig. 5 may be modified to employ a cavity resonator. The anode segments 11, 12 and 13 of Fig. 5 are replaced in Fig. 6 by the slotted end wall or plate 32 of a cavity resonator 34 which may be a section of a conductive-walled or hollow pipe wave guide. The slots in the plate 32 comprise an input gap 4 and an output gap 5. The resonant chamber may be bounded at the end opposite the slotted wall by an apertured partition or iris diaphragm 35 in which the aperture 36 permits electromagnetic waves to be transmitted to an external system such as an extended wave guide 37. The envelope 18 may be suitably sealed to the walls of the resonator 34 and the aperture 36 may be made vacuum-tight by a plug 38 of dielectric material. The length of the resonator 34 will ordinarily be approximately one-half wave-length of the desired oscillation frequency, the wave-length being that peculiar to the electromagnetic wave as propagated inside the wave guide rather than the free space wave-length. The resonator 34 will, of course, need to be of sufficiently large diameter to freely transmit a wave of the desired wave-length.

The modification shown in Fig. 7 employs a folded resonating chamber and may be preferred where it is desired to decrease the over-all length of the apparatus. The resonator 39 shown in Fig. 7 may have an over-all length of approximately a quarter wave-length. A conductive partition 40 conductively connected to the plate 32 extends from side wall to side wall between the slots and nearly the full length of the resonator 39. A coupling loop 41 may be provided to deliver oscillations to an outgoing coaxial line.

Figure 8:
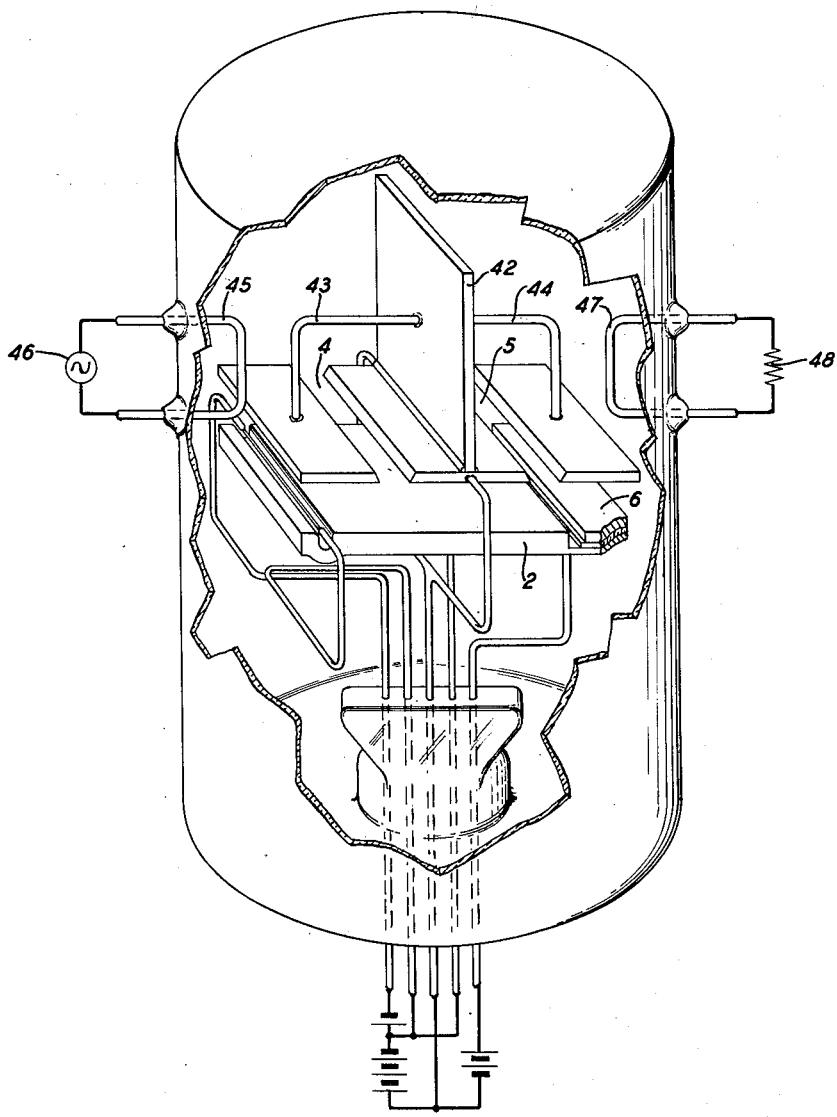
Fig. 8 is a perspective view, partially broken away, showing an embodiment of the invention in an amplifier.

Fig. 8 illustrates an embodiment of the invention in an amplifier. In the arrangement of Fig. 8 the conductor 15 used in Fig. 5 is replaced by a conductive plate 42. The conductors 14 and 16 are replaced respectively by conductors 43 and 44 connected to opposite sides of the plate 42. An input coupling loop 45 is arranged adjacent the conductor 43. The collector plate 6 may be insulatingly mounted upon a shoulder cut in the ground plate 2, as shown. Waves to be amplified may be supplied by a source 46 connected to the loop 45. The impressed oscillations serve to set up alternating potentials across the input gap 4. The amplified oscillations are set up in the resonant circuit including the conductor 44. A coupling loop 47 is mounted adjacent the conductor 44 and is connected to a load device 48. The detailed operation of the system of Fig. 8 as an amplifier will be readily understood from the description hereinabove given in connection with Fig. 1.

Figure 9:
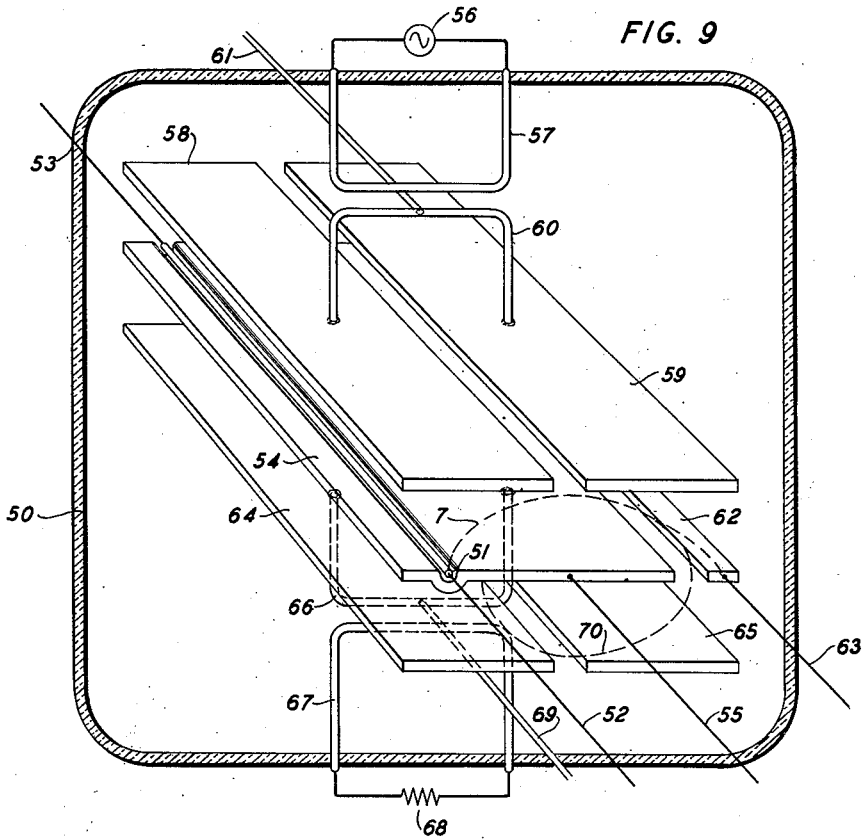
Fig. 9 is a perspective view, partly diagrammatic, of an embodiment in an electron coupled amplifier.

In an alternative mode of operation of devices in accordance with the invention, the faster group of electrons may be utilized in the excitation of the output circuit in place of the slower group. This mode of operation may be used with a small accompanying reorganization of the apparatus. Fig. 9 shows an amplifier arranged to effect excitation of the output circuit by means of the faster group of electrons. The chief modification comprises the placing of the input and output circuits on opposite sides of the ground plate, in the form of separate anodes. Each anode may comprise two segments defining a single gap. It may be necessary in some cases to provide increased separation between the ground plate and the collector in order to accommodate the passage of accelerated electrons therebetween in a variety of trajectories.

In the arrangement of Fig. 9, a vacuum container is represented by the envelope 50. The leads by which the energizing and biasing potentials are applied to the various electrodes within the vacuum compartment are shown for simplicity by solid lines crossing the envelope 50. For simplicity, also, the energizing sources of electromotive force have been omitted since they may be readily supplied as shown in Figs. 5 and 8. A cathode 51 is represented as supplied by heating leads 52 and 53. A ground plate 54 is provided with a groove for accommodating the cathode 51. External connection to the ground plate is provided by means of a lead 55. A source of high frequency waves to be amplified is represented by a generator 56, coupled by means of a loop 57 to an input tuned circuit comprising two anode segments 58, 59 joined by a conductor 60 and defining an input gap between the segments 58 and 59. A suitable positive potential may be impressed upon the system 58, 59, 60 by means of a lead 61 preferably symmetrically disposed, as shown. A collector 62 is provided in the same plane as the ground plate 54 and is connected to a lead 63. On the opposite side of the ground plate from the system 58—60 is provided an output tuned circuit comprising two anode segments 64, 65 joined by a conductor 66 and defining an output gap between the segments 64 and 65. An output loop 67 is provided in inductive relation to the conductor 66 and has its ends led out to a load circuit which is represented by a resistor 68. A suitable positive potential may be impressed upon the anode system 64—66 through a lead 69.

In the operation of the system of Fig. 9, the typical electron leaving the cathode 51 travels in a cycloidal trajectory 7 and in passing the vicinity of the input gap 58, 59 the electron receives a velocity variation due to the impressed waves from the generator 56 acting through the coupling system 57 to 60, inclusive. The accelerated electrons pass through the gap between plates 54 and 62 and as they emerge they come into the field between the ground plate and the output anode system 64, 65, 66. An accelerated electron thus emerging follows a generally cycloidal trajectory 70 which carries it to the vicinity of the output gap between the anode segments 64, 65 and finally causes the electron to strike the lower side of the plate 54 as shown. The decelerated electrons are carried past the gap between electrodes 54 and 62, to the collector 62. The accelerated electrons, thus separated from the decelerated electrons, form an intermittent or density varied stream which serves to excite the output tuned circuit as the stream passes the vicinity of the gap between electrodes 64 and 65.

Figure 10:
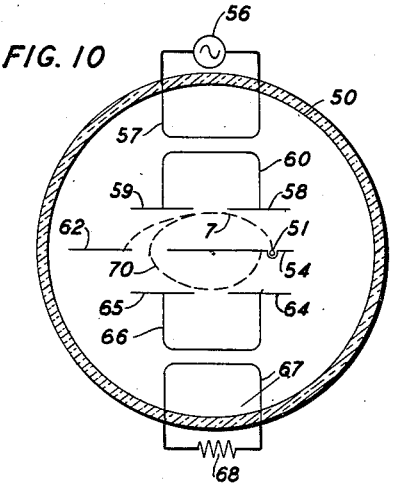
Fig. 10 is a schematic diagram corresponding to Fig. 9.

Fig. 10 is a simplified schematic representation of the arrangement of Fig. 9, the elements being correspondingly numbered in the two figures.

Other modifications of the structures hereinabove described enable the system to be adapted for use as a master oscillator-amplifier combination in which the coupling between the oscillator and the amplifier is effected by means of the electron stream. There is thus provided what is commonly termed an electron-coupled oscillator. Examples of this are shown in Figs. 11 and 18 by means of simplified schematic representations.

Figure 11:
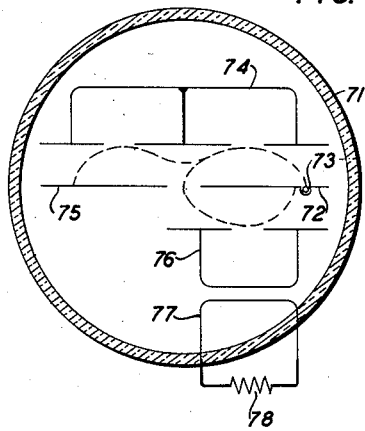
Fig. 11 is a schematic diagram of an electron coupled oscillator-amplifier arrangement.

In Fig. 11 there is shown, within a vacuum container 71, a ground plate 72 having on one side thereof a cathode 73 and a tuned circuit 74 of the three-segment anode type disclosed in Fig. 5. Coplanar with the ground plate 72 is a collector plate 75. On the reverse side of the ground plate 72 from the cathode 73 is an output tuned circuit 76 like the system 64, 65, 66 shown in Fig. 10. A coupling loop 77 is provided in inductive relation to the circuit 76 and is connected to a load 78.

In the operation of the arrangement of Fig. 11, the oscillator section is excited by the slower group of electrons as in the arrangement of Fig. 5 and the spent electrons of the slower group are collected on the plate 75. The electrons of the faster group pass through the space between the plates 72 and 75 as in the arrangement of Figs. 9 and 10 where they serve to excite the tuned circuit 76 which in turn supplies oscillations to the load 78 through the coupling loop 77. The load 78 may be varied without disturbing to any appreciable extent the operating conditions of the oscillator section. Therefore, the load has a minimum of disturbing effect upon the frequency of the oscillator.

Fig. 12 shows a modification of the tuned circuit of Fig. 5. The anode segments 11 and 13 of Fig. 5 are merged into a single segment 100 which may surround a middle segment 101 as shown. The inductive connection between the segments 100 and 101 comprises the conductors 14, 15 and 16 corresponding to those similarly numbered in Fig. 5.

Fig. 13 shows a tuned circuit similar to that of Fig. 12 but with the inductive connection between the plates 100 and 101 simplified so as to eliminate the conductor 14.

Figs. 14 and 15 show tuned circuits similar in principle respectively to the tuned circuits of Figs. 12 and 13.

In the arrangement of Fig. 14, a conductive bar 102 takes the place of the conductors 14, 15, 16, inclusive, of Fig. 12. In this kind of structure there is less inductance in the connector 102 and resonance is determined to a greater extent by distributed inductance in the segments 100 and 101.

In the arrangement of Fig. 15 the inductive connection 15, 16 is replaced by a bar 103. Here again the inductance relied upon for resonance resides mainly in the distributed inductance of the segments 100 and 101.

Figure 16:
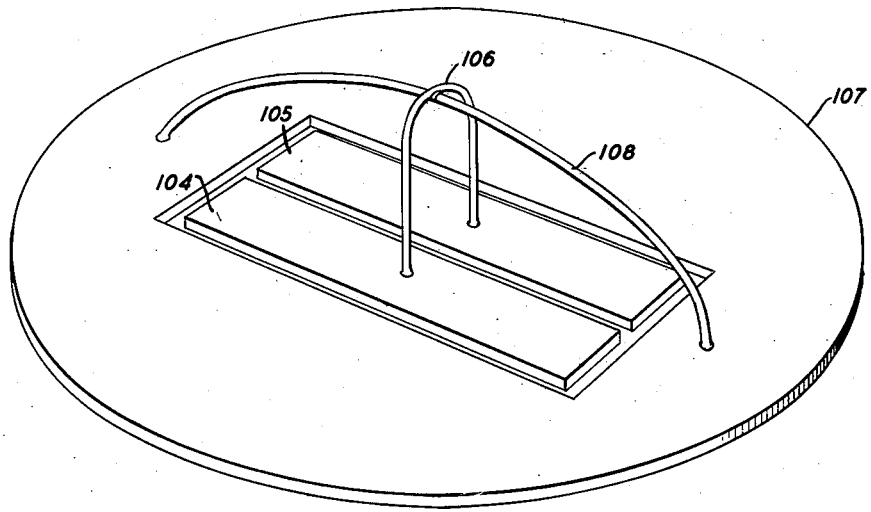

Fig. 16 shows a tuned circuit comprising a pair of anode segments 104 and 105 joined by an inductive conductor 106. The arrangement is mounted so that the plates 104 and 105 are coplanar with a guard plate 107 and are positioned in an opening therein. The conductor 106 is conductively connected to and supported by a conductor 108 which is in turn conductively connected to and supported by the plate 107. The conductor 108, while it may represent an appreciable inductance can still serve as an untuned connection between the conductor 106 and the plate 107. It is only necessary that the system 107, 108 shall not support electromagnetic oscillations at a frequency in the neighborhood of the desired operating frequency. Under this condition, the anode segments 104 and 105 may sustain an alternating potential, while the plate 107 and connector 108 will remain at a substantially unvarying potential.

Figure 17:
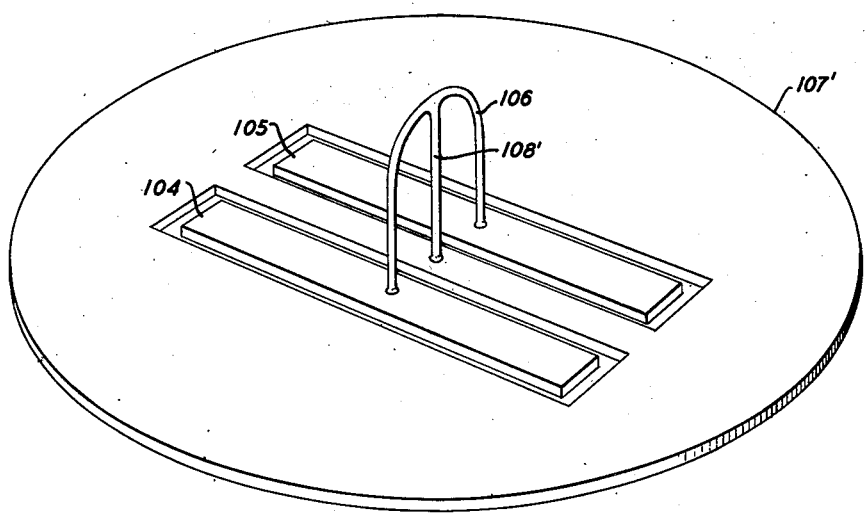

Fig. 17 shows a tuned circuit which is a modification of that shown in Fig. 16. A guard plate 107' has two openings within which the plates 104 and 105 are positioned respectively. The conductor 106 connects the plates 104 and 105 as in Fig. 16 and a conductor 108' connects the middle of the conductor 106 to the portion of the plate 107' between the two openings.

In Fig. 18 is shown an arrangement generally similar to that of Fig. 11 and containing several added features. The tuned circuit 74 may be of the type shown in Fig. 17, the broken lines 86' and 87' representing conductive connections effected within the body of plate 107' of Fig. 17. The tuned circuit 76 may be of the type shown in Fig. 16, broken lines 86, 87 and 88 representing the conductor 108 of Fig. 16. The ground plate 72 is in two sections separated by a gap and connected by an untuned conductive connection 89. Opposite the gap in the plate 72 is provided a grid 90 which may be used for modulation or other control purpose. An additional collector 91 is arranged in the plane of the plate 72. The crossed circle at the letter H is symbolic to represent the direction of the steady magnetic field, into the plane of the paper and parallel to the cathode 73. The steady magnetic field may be supplied by any suitable means (not shown) as, for example, an electromagnet as shown in Figs. 5 and 5A.

In the operation of the arrangement of Fig. 18, the tuned circuit 74 may be kept at a desired positive potential with respect to the plate 72. The tuned circuit 76 may be kept at a different positive potential with respect to the plate 72. By properly arranging the spacing of the respective plates, the system may be operated with a higher potential in the amplifier section than in the oscillator section, if desired.

Fig. 19 shows in longitudinal section an adaptation of the arrangement of Fig. 10 which enables the device to operate as a repeater in a wave guide transmission system. The wall of a wave guide is shown at 93. A resonant section of wave guide, preferably constituting a half wavelength resonator is defined by iris diaphragms represented schematically at 94 and 95. Diaphragm 94 may be variable as to the size of the aperture and diaphragm 95 may have a fixed aperture hermetically sealed by a window 96 of dielectric material. Similar elements 94', 95' and 96' may be provided to determine another half-wave resonator and a chamber 97 between the diaphragms 95 and 95'. In the chamber 97 may be located a cathode 51, a ground plate 54 and a collector 62, similar to the corresponding elements shown in Fig. 10.

In the operation of the arrangement of Fig. 19, the apertures in the diaphragms 95 and 95' correspond respectively to the gaps in the input and output tuned circuits of the arrangement of Fig. 10. A wave transmitted from left to right through the wave guide will be resonated in the chamber between the diaphragms 94 and 95 and will impress an alternating potential across the input gap. The output potential will be impressed across the output gap and will act through the window 96', to set up an amplified wave in the resonator between the diaphragms 95' and 94'. The amplified wave will be transmitted through the aperture of the diaphragm 94' and be propagated along to the right through the wave guide.

It will be suggested by inspection of the tuned circuits of Figs. 14 and 15 that other equivalent tuned circuits may be produced out of a plate alone without external connectors by providing suitable slots in the plate. The slots may be closed at the ends or they may be open, coming out to the edges of the plate. Fig. 20 shows an illustrative example of a system with a tuned circuit made by cutting slots in a plate. In Fig. 21, a similar result is secured by using suitably shaped segments which have their respective edges separated by a gap.

In the arrangement of Fig. 20 a single plate 110 is provided with input and output slots 111 and 112 respectively which are open at one end. The plate 110 may be supported by an insulating post 113, preferably located at a nodal point with respect to electromagnetic oscillations of the plate 110. The configuration of the tuned circuit of Fig. 20 is such that the electric intensity at the gaps 111 and 112 is oppositely directed at any given instant as indicated by the polarity signs in the figure. Consequently, a transit time of an odd number of half cycles between the gaps 111 and 112 is required to meet the condition for sustained oscillations. This is in counterdistinction to the cases in which the electric intensities at the gaps are in the same sense at any given instant, in which case a transit time of an even number of half cycles is required. A suitably shaped coupling conductor 114 may be mounted parallel to the plate 110 for picking up oscillations to be transmitted to a load circuit. Fig. 20 also illustrates the use of an indirectly heated cathode 115 which may be in the form of a ribbon, strip or stripe of thermionically active substance inlaid, painted or otherwise disposed upon the surface of the ground plate. In this case the cathode may be heated by a separate heating conductor or in any suitable fashion.

Fig. 21 shows a tuned circuit comprising a T-shaped plate 116 and a U-shaped plate 117. Distributed capacity is provided between the adjacent edges of the plates 116 and 117. The plates may be supported on insulating posts 118 and 119, respectively, which are preferably located at points of unvarying potential in the plates. A coupling loop 120 is provided in a plane parallel to the plates 116 and 117.

Fig. 22 shows an oscillator structure generally similar to that shown in Fig. 5. The difference is that the inductive connection 14—16, inclusive, is replaced by two similar inductive connections 121 and 122, near opposite ends of the anode segments, and a coupling loop 123 is placed between the conductors 121 and 122 in inductive relation to both.

Fig. 23 illustrates another arrangement for coupling an oscillator to a wave guide. The oscillator, which is generally similar to that shown in Fig. 5 has a ground plate 130 comprising a disc fitting snugly into a hollow pipe wave guide 131. The tuned circuit is indicated at 132. A coupling loop 133 is mounted in an insulating disc 134 which also fits snugly into the pipe 131. The ends of the loop 133 extend through the disc 134 into the interior of an adjoining wave guide 136 to constitute a dipole 135. The pipe 131 may be evacuated and sealed off or it may be connected to a vacuum pumping system. In the latter case, the plate 130 is preferably provided with an aperture 137 through which the space between the discs 130 and 134 may be evacuated. The dipole 135 when actuated by the oscillator serves to set up traveling electro-magnetic waves within the wave guide 136.

Figs. 24 and 25 indicate how the arrangement of the invention may be adapted to utilize concentric cylindrical plates in place of plane parallel plates. A hollow cylindrical conductor 140 closed by conductive end plates 141 and 142 serves in place of the plate 1 of Fig. 5. A cup-shaped conductor 143 is mounted surrounding and spaced apart from the slotted portion of the conductor 140. Separated from the open end of the conductor 143 is placed a hollow conductive tube 144 of the same diameter and coaxial therewith. The ends of the conductors 143 and 144 are joined by an annular dielectric seal 145 which may be a fused glass ring. The inner and outer cylindrical assemblies described are held in place by another annular dielectric seal 146 which may also be a glass ring. Alternate segments of cylinder 140, such as segments 147 and 148, for example, are joined to an unslotted portion 149 which forms the inner conductor of a coaxial transmission line of which the cylinder 144 is the outer conductor. Intermediate segments of cylinder 140, such as 150 and 151, for example, are conductively joined to the cylinder 144 by means of a conductive bridge member 152 which is formed to have clearance from the group of segments comprising 147, 148. The segments together with the coaxial line form a half-wave resonator short-circuited at one end by the end plate 141 and at the other end by an annular tuning plunger 153, the latter being adjustable in position by means comprising a knob 154.

A cathode 155 is insulatingly mounted in axial position on the inner surface of the cup 143. A collector plate 156 is insulatingly mounted parallel to and a short distance to one side of the cathode 155. A suitable magnetic field in the axial direction is supplied by means such as an electromagnet coil 157. The resonator may be provided with a coaxial output lead 158.

The operation of the system of Figs. 24 and 25 is generally similar to that of Fig. 5. Besides the substitution of cylindrical for plane plates the number of gaps to be traversed by the slower group of electrons has been increased. The typical trajectory of an electron of the slower group is indicated by the broken line 159 which is a trochoidal curve of gradually decreasing amplitude of excursion in the radial direction. With proper adjustment of the electric and magnetic fields the electron may be made to contribute energy to the resonator at each gap. The static fields are to be so adjusted that the electron trajectories will curve away from the collector plate 156 as they first leave the cathode 155. The group of electrons that receive an acceleration at the first or input gap will strike the inner surface of the can 143 and be removed from the stream.

While means for supplying the necessary steady component of magnetic field are shown only in Fig. 5, it will be understood that suitable means for this purpose are to be supplied in each arrangement illustrated. Mechanical supports for the elements have also been omitted from several of the figures in the interest of focusing attention upon those features which form a part of the present invention.

What is claimed is:

1. A magnetron comprising two systems of coplanar plate electrodes located in parallel planes respectively, the first of said plate systems comprising three anode segments defining between pairs of adjacent edges an input gap and an output gap respectively, said gaps extending parallel to each other, the second of said plate systems comprising a ground plate and a collector plate insulated from each other, a linearly extended cathode substantially in the plane of said ground plate and oriented parallel to said input and output gaps, the distance between said input and output gaps being substantially $\pi$ times the separation between said parallel planes, and the distance between the cathode and the input gap as projected upon said parallel planes being one-half the distance between said input and output gaps, and conductor means connected to said anode segments across said input and output gaps, respectively, and forming a resonant system.

2. An oscillator comprising a ground plate, an anode plate system parallel to said ground plate and spaced therefrom a given distance $a$, said anode plate system comprising three coplanar segments having parallel adjacent edges defining an input gap and an output gap, said gaps having their centers spaced apart a distance equal to $\pi a$, a cathode extending parallel to said input and output gaps and substantially coplanar with said ground plate, said cathode being a distance equal to $$\frac{1}{2}\pi a$$

from the projection of the said input gap upon said ground plate in the direction away from said output gap, a resonant system including said anode segments and coupling said input gap and said output gap, means adjacent to the space between said ground plate and said anode to maintain substantially constant crossed electric and magnetic fields in the space between said ground plate and said anode to constrain electrons from said cathode to follow trochoidal paths normally passing close to said input gap and said output gap, means including part of said resonant system to velocity vary the electron stream at said input gap whereby the faster electrons are made to strike said ground plate, and means including part of said resonant system to abstract energy from the slower electrons at said output gap.

3. An oscillator in accordance with claim 2 in which the said substantially constant electric field is uniformly directed perpendicular to the said parallel plates in the sense to impel electrons toward said anode system, and in which the said substantially constant magnetic field is uniformly directed parallel to said cathode and in which the given distance $a$ in centimeters and the electric and magnetic field intensities E and M respectively in electromagnetic units are related according to the formula $$a=\frac{2mc^2E}{eh^2}$$

where $m$ is the mass of an electron in grams, $e$ is the electronic charge in electromagnetic units and $c$ is the velocity of light in centimeters per second.

4. An oscillator comprising a ground plate, an anode plate system parallel to said ground plate and spaced therefrom a distance $a$, said anode plate system comprising three coplanar segments having parallel adjacent edges defining an input gap and an output gap, said gaps having their centers spaced apart a distance equal to $\pi a$, a cathode extending parallel to said input and output gaps and substantially coplanar with said ground plate, said cathode being a distance equal to $$\frac{1}{2}\pi a$$

from the projection of the said input gap upon said ground plate on the side away from said output gap, a system resonant to a given wave-length $\lambda$ including said anode segments coupling said input gap and said output gap together to provide a feedback, substantially constant potential difference means of $V_0$ volts connected between said ground plate and said anode system and poled to impel electrons from said ground plate toward said anode system, means to maintain a substantially constant magnetic field of intensity H in said space in a direction parallel to said cathode and poled to turn toward the input gap electrons emitted from said cathode, said distance $a$ being related to the wave-length $\lambda$ according to the formula $$a=\frac{n\lambda\sqrt{V_0}}{3160}$$

where $n$ is an integer and H is determined by $$\lambda H=\frac{10650}{n}$$

where H is in oersteds and $n$ is the same integer aforementioned.

5. An amplifier comprising a ground plate, an anode plate system parallel to said ground plate and spaced therefrom a distance $a$, said anode plate system comprising means defining a pair of gaps spaced apart a distance equal to $\pi a$, a cathode substantially coplanar with said ground plate, said cathode being a distance equal to $$\frac{1}{2}\pi a$$

from the projection of one of said gaps upon said ground plate on the side away from the other of said gaps, substantially constant voltage supply means of voltage $V_0$ connected between said ground plate and said anode system and poled to impel electrons from said ground plate toward said anode system, means adjacent to the space between said ground plate and said anode to maintain a substantially constant magnetic field of intensity H in said space in a direction parallel to the axis of said cathode and poled to turn toward the nearest of said gaps electrons emitted from said cathode, the values of $a$, $V_0$ and H being related in accordance with the formula $$a=\frac{c}{H}\sqrt{\frac{2mV_0}{e}}$$

where $m/e$ is the ratio of mass to charge for an electron and $c$ is the velocity of light.

6. An oscillator comprising a cathode, a hollow pipe wave guide having for an end closure a conductive end plate containing a pair of slots defining an input gap and an output gap, respectively, said wave guide constituting a coupling between said input and output gaps, and said end plate being mounted opposite said cathode to constitute an anode therefor, means in the region adjacent to said end plate outside said wave guide to constrain electrons from said cathode normally to move in paths grazing said input gap and said output gap successively, and receding from said end plate between said gaps to a distance variable in accordance with the instantaneous potential difference across said input gap and a ground plate opposite said end plate and spaced therefrom a distance sufficient to block a portion only of the said electron paths.

7. An oscillator in accordance with claim 6 with a conductive partition in said wave guide located substantially an integral number of half wave-lengths, including one, from said end closure, and coupling means operative through an opening in said partition to transmit waves to the portion of said wave guide beyond said partition.

8. An amplifier comprising a ground plate, an anode plate system parallel to said ground plate and spaced therefrom a given distance $a$, said anode plate system having therein, a pair of gaps parallel to each other and having their centers spaced apart a distance equal to $\pi a$, a cathode extending parallel to said gaps and substantially coplanar with said ground plate, said cathode being a distance equal to $$\frac{1}{2}\pi a$$

from the projection of one of said gaps upon said ground plate in the direction away from the other of said gaps, a resonant system including said anode plate system, and means adjacent to the space between said ground plate and said anode plate system to maintain substantially constant crossed electric and magnetic fields in the space between said ground plate and said anode plate system to constrain electrons from said cathode to follow trochoidal paths normally passing close to each of said gaps successively.

9. Apparatus in accordance with claim 8 in which the said resonant system constitutes a coupling between the said gaps.

ARNOLD E. BOWEN.

REFERENCES CITED

The following references are of record in the file of this patent:

UNITED STATES PATENTS

| Number | Name | Date |
|---|---|---|
| 2,108,640 | Bieling | Feb. 15, 1938 |
| 2,175,697 | Nelson | Oct. 10, 1939 |
| 2,199,045 | Dallenbach | Apr. 30, 1940 |
| 2,200,063 | Heising | May 7, 1940 |
| 2,221,070 | Banks | Nov. 12, 1940 |
| 2,223,082 | Van Mierlo | Nov. 26, 1940 |
| 2,232,050 | Clavier et al. | Feb. 18, 1941 |
| 2,250,096 | Engbert | July 22, 1941 |
| 2,271,716 | Salzberg | Feb. 3, 1942 |
| 2,275,480 | Varian et al. | Mar. 10, 1942 |
| 2,289,220 | Smith | July 7, 1942 |
| 2,317,503 | Usselman | Apr. 27, 1943 |
| 2,321,912 | Hedberg | June 15, 1943 |
| 2,414,121 | Pierce | Jan. 14, 1947 |
| 2,428,612 | Blewett | Oct. 7, 1947 |